United States Patent
Reichel

(10) Patent No.: US 8,161,605 B2
(45) Date of Patent: Apr. 24, 2012

(54) HOSE CLAMP

(75) Inventor: Ralf Reichel, Marsberg-Meerhof (DE)

(73) Assignee: Norma Sweden AB, Stockholm (SE)

( * ) Notice: Subject to any disclaimer, the term of this patent is extended or adjusted under 35 U.S.C. 154(b) by 870 days.

(21) Appl. No.: 11/631,509

(22) PCT Filed: Jul. 7, 2005

(86) PCT No.: PCT/SE2005/001124
§ 371 (c)(1),
(2), (4) Date: Oct. 6, 2008

(87) PCT Pub. No.: WO2006/011838
PCT Pub. Date: Feb. 2, 2006

(65) Prior Publication Data
US 2009/0031538 A1    Feb. 5, 2009

(30) Foreign Application Priority Data

Jul. 29, 2004  (DE) .................. 20 2004 011 936 U
Aug. 19, 2004  (DE) .................. 20 2004 013 043 U

(51) Int. Cl.
*F16L 3/08* (2006.01)
(52) U.S. Cl. .................. 24/20 R; 248/74.1; 248/74.3
(58) Field of Classification Search ............... 248/74.1, 248/74.2, 74.3, 74.4; 24/20 R
See application file for complete search history.

(56) References Cited

U.S. PATENT DOCUMENTS

| 2,445,481 | A |   | 7/1948  | Ge Wertz |
| 3,169,004 | A |   | 2/1965  | Rapata |
| 4,790,502 | A | * | 12/1988 | Saegusa ............... 248/74.1 |
| 5,028,021 | A | * | 7/1991  | Sugiyama et al. ...... 248/74.5 |
| 6,443,403 | B1 | * | 9/2002  | Page et al. ............ 248/74.3 |
| 6,481,061 | B1 | * | 11/2002 | Andre et al. ............. 24/20 R |

FOREIGN PATENT DOCUMENTS

| DE | 20105870 | 8/2001 |
| EP | 1186817 | 3/2002 |
| FR | 2476246 | 8/1981 |
| JP | 50-131115 | 9/1975 |
| JP | 55-23204 | 6/1980 |
| JP | 56-35808 | 4/1981 |
| JP | 57-20936 | 5/1982 |
| JP | 57-25025 | 5/1982 |
| JP | 58-21124 | 2/1983 |
| JP | 61-133191 | 8/1986 |
| JP | 51-14230 | 5/1993 |
| JP | 52-44964 | 9/1993 |

(Continued)

OTHER PUBLICATIONS

International Search Report (PCT/ISA/210.

(Continued)

*Primary Examiner* — Robert J Sandy
(74) *Attorney, Agent, or Firm* — Harness, Dickey & Pierce, P.L.C.

(57) ABSTRACT

A clamp is disclosed, especially for retaining hoses, pipes, cables or the like. The clamp includes an annular curved fixing strip including a first end and a second end, two flanges each connected to a respective end of the fixing strip, and openings in the flanges for guiding though a tensioning device. At least one of the flanges includes a connecting device for producing a riveted joint between flanges.

19 Claims, 4 Drawing Sheets

FOREIGN PATENT DOCUMENTS

| | | |
|---|---|---|
| JP | 60-79064 | 3/1994 |
| JP | 7-41099 | 9/1995 |
| JP | 11-082432 | 3/1999 |
| JP | 2002-176722 | 6/2002 |
| JP | 2002-364685 | 12/2002 |
| JP | 2003-120636 | 4/2003 |
| RU | 2075002 | 3/1997 |
| SU | 916869 | 3/1982 |

OTHER PUBLICATIONS

English translation of Office Action dated Dec. 24, 2010 for corresponding Japanese Patent Application No. 2007-523510.

P.I. Orlov, "Design Principles," vol. 2, pp. 48-49, Moscow, 1988.

Notice of Decision of Final Rejection dated Apr. 27, 2011 issued in Korean Application No. 10-2007-7000421 and English translation thereof.

Supplemental European Search Report dated Jun. 2, 2010 for corresponding European Patent Application No. EP 05 75 7189.

Office Action dated Nov. 10, 2010 for corresponding Korean Patent Application No. 10-2007-7000421 w/English translation.

Notice of Results of Re-Consideration Prior to Trial dated Sep. 2, 2011 for corresponding Korean Patent Application No. 10-2007-7000421.

* cited by examiner

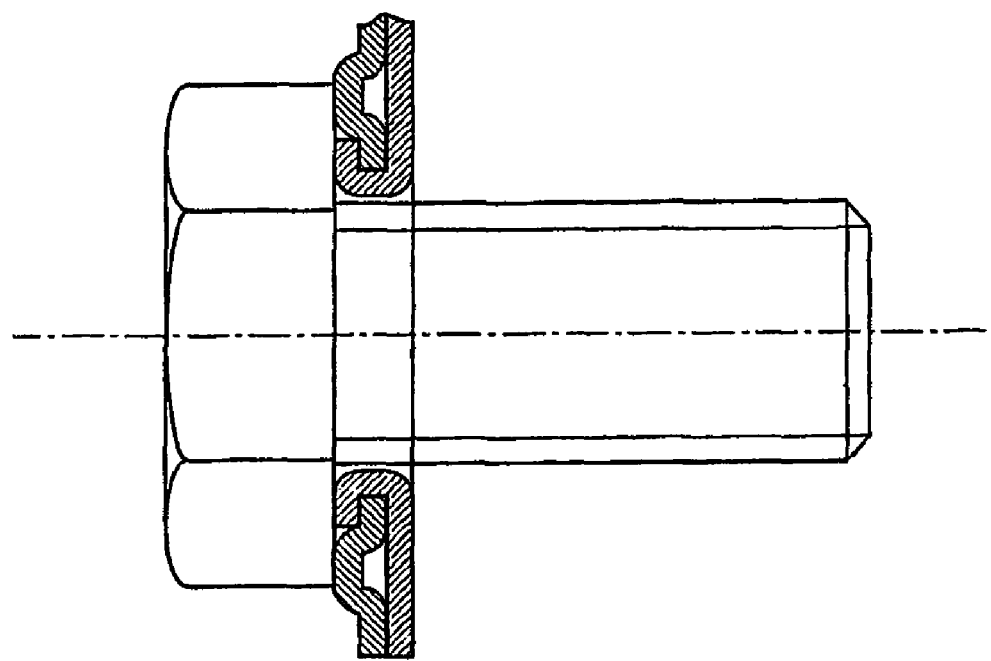
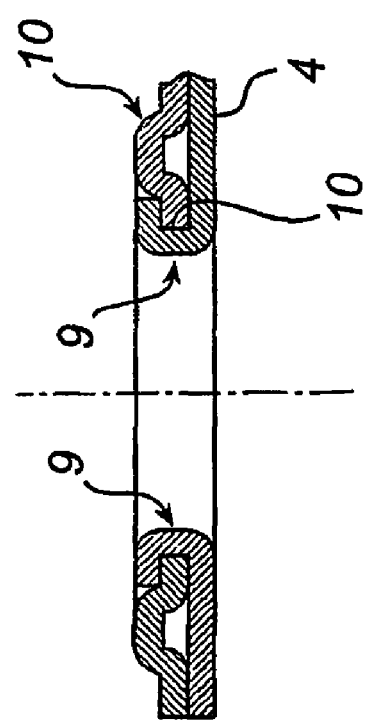
Fig. 3a
Fig. 3b

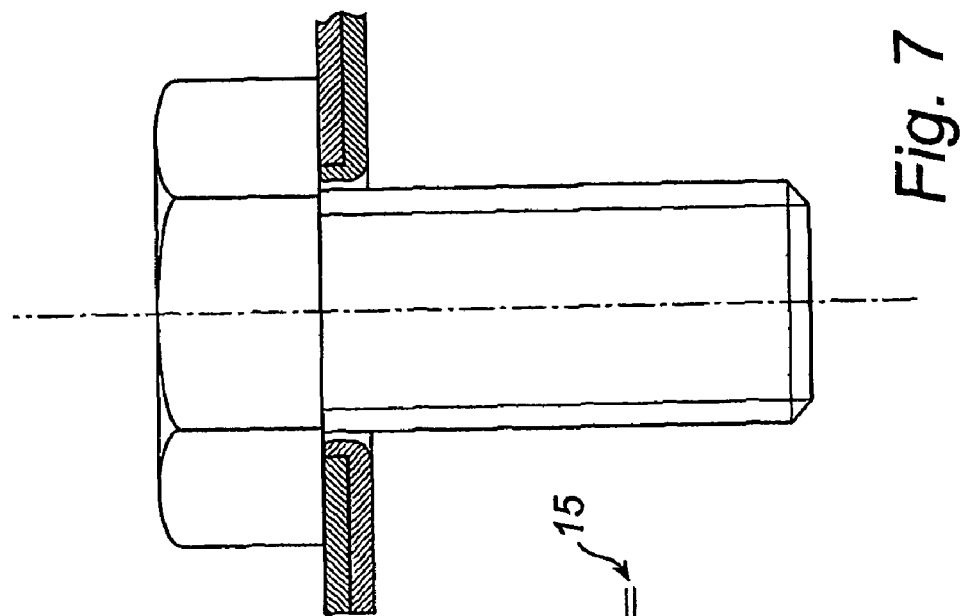
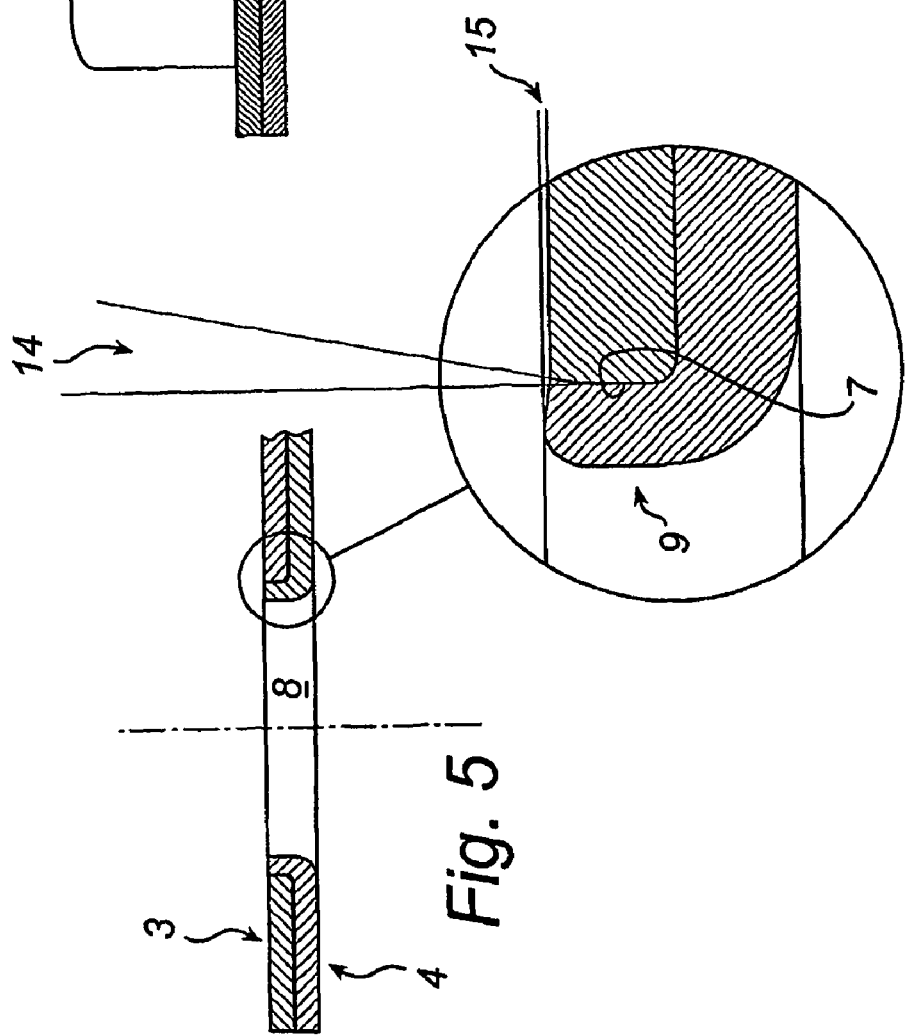
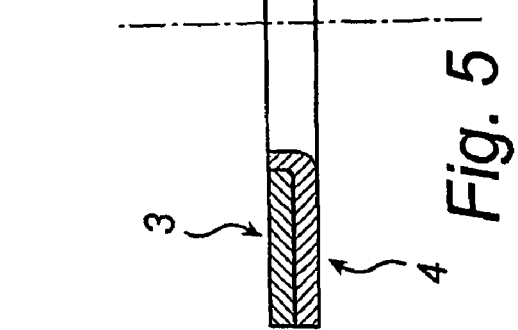

HOSE CLAMP

Example embodiments relate to a clamp, especially for retaining hoses, cables, pipes or the like.

BACKGROUND

Such a clamp is known, for example, from DE 201 05 870 U1. The clamp has a substantially annular fixing strip with two fixing flanges, each provided with a hole for passing through a tightening screw.

During assembly the flanges are pressed towards one another, the openings are aligned with respect to one another and the tightening screw is guided through the openings. The tightening screw is then tightened.

In order to facilitate assembly, especially to facilitate the mutual alignment of the flanges and the insertion of the tightening screw into the opening, the clamp is provided with a preassembly lock. The preassembly lock substantially consists of a hook formed on one of the flanges which has an undercut for hooking on the other fixing flange. By this means a connection can be made between the flanges before the actual final assembly. The hook can also be used to preassemble clamps on an assembly, i.e., to supply an assembly with pre-assembled clamps.

SUMMARY

Starting therefrom, it is the object of the present invention to provide a clamp with a preassembly lock which ensures that the pre-assembled clamp is reliably held and allows exact alignment of the fixing flanges and enveloping use.

The clamp, especially for retaining hoses, comprises an annular curved fixing strip having a first end and a second end, two flanges each connected to one end of the fixing strip, and openings in the flanges for guiding through a tensioning means. In addition, at least one of the flanges has connecting means for producing a riveted joint between the flanges.

A riveted joint is formed by a form-locking connection of the flanges by a plastically deformed, usually cylindrical, connecting element, the so-called rivet. Such a connection is not liable to damage. Any unintentional release of the riveted joint and possible loss of the preassembled clamps is virtually eliminated. A secure connection is thus achieved between the two fixing flanges. The riveted joint serves among other things as a preassembly lock when assemblies are supplied fitted with preassembled clamps. In this case, the flanges are reliably connected to one another by the riveted joint before the tensioning means, usually a tightening screws is tightened during the final assembly in order to especially fix a hose or a pipe section. The preassembly of the clamps facilitates the guiding of the tightening screw through the openings of the flanges.

The connecting means preferably comprise at least one deformable pass-through member arranged on one of the flanges. The pass-through member forms a substantially cylindrical connecting element. Naturally, the pass-through member can be interrupted at one or a plurality of points or it can consist of a plurality of sections.

The pass-through member is especially constructed as plastically deformable. In this way, it should be possible to achieve a secure connection and simple preassembly. The material and thickness of the pass-through member are suitably selected to meet the requirements for a riveted joint.

The pass-through member is preferably arranged in a. ring shape on one of the flanges so that the pass-through member can be guided through the opening in the other flange during preassembly. This ensures an exact adjustment of the flanges, especially an exact mutual alignment of the openings.

The pass-through member can be arranged in the area of the opening on one of the flanges. For example, the pass-through member can be provided at the edge of the opening of the flanges and thus additionally bring about strengthening against deformation when the tightening screw is tightened during the final assembly.

The pass-through member especially extends from one of the flanges through the opening of the other flange.

The pass-through member preferably extends substantially perpendicularly from one of the flanges.

The free end of the pass-through member is especially deformed to produce a riveted joint between the flanges. The flanges are thus securely held on one another in the preassembled state.

The free end of the pass-through member can be outwardly deformed and lies on the other flange.

In the area of the opening of at least one of the flanges, the clamp preferably has a profiling for stiffening the flange. The profiling is used to stabilise the flange or flanges. The profiling can have an embossing in the direction of the head of the tightening screw used in the final assembly. The profiling can also serve to brace the flanges with respect to one another to prevent any loosening of the tightening screw guided through the openings before assembly.

The profiling especially comprises a stiffening corrugation which surrounds the opening in a ring shape.

BRIEF DESCRIPTION OF THE DRAWINGS

Further exemplary embodiments, features and advantages of the invention are obtained from the following description of a special exemplary embodiment. In the figures:

FIG. 3a is an enlarged section from FIG. 2;
and
FIG. 3b shows the embodiment from FIG. 3a with screw,
FIG. 5 is a further exemplary embodiment of the clamp according to the invention,
FIG. 6 is a detailed view of the exemplary embodiment from FIG. 5,
and
FIG. 7 shows the exemplary embodiment from FIG. 5 with screw.

DETAILED DESCRIPTION OF EXAMPLE EMBODIMENTS

Figure 1:
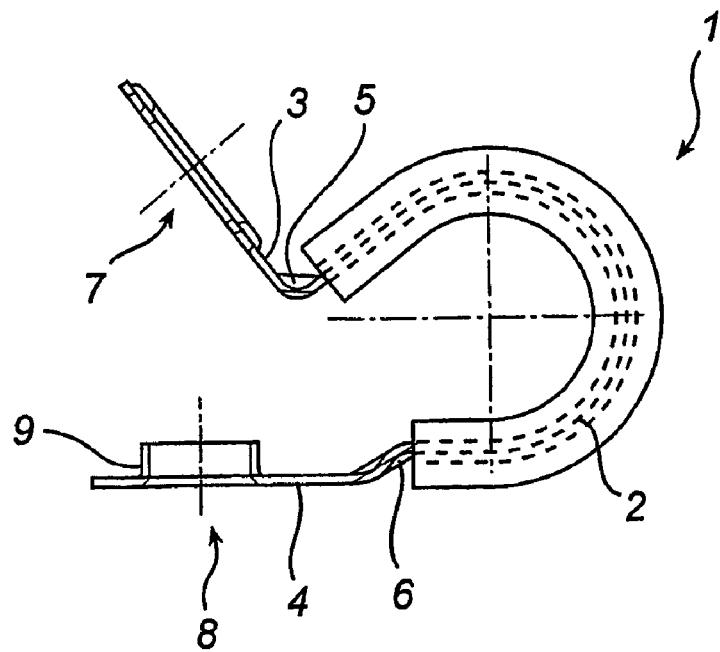
FIG. 1 is a side view of an opened clamp as delivered.

FIG. 1 shows an opened clamp 1 according to the invention, which has not yet been preassembled, as it is delivered to the preassembly site.

The clamp 1 has an annular curved fixing strip 2 having fixing flanges 3 and 4 connected to its two ends. The first fixing flange 3 extends substantially at right angles from the first end of the fixing strip 2, the second fixing flange 4 is connected to the second end of the fixing strip 2 via a step.

The fixing flanges 3 and 4 are not yet joined together when delivered so that the clamp 1 can be guided around hoses, cables, pipes or the like to be fixed or around hose ends to be joined in order to enclose these. elements. Stiffening corrugations 5 and 6 are arranged at the transitions between the fixing strip 2 and the flanges 3 and 4 in order to prevent any deformation of the bend or the step. In this way it is ensured that when the clamp is closed, the flanges rest parallel on one another without the assembler exerting any force.

Openings 7 and 8 are provided in the flanges 3 and 4 through which a tightening screw can be guided during final assembly. If possible, the openings 7 and 8 should come to lie congruently above one another before final assembly so that the tightening screw can be guided through the openings 7 and 8 without any problems.

A pass-through member 9 extends from the lower flange 4 substantially perpendicularly in the direction of the upper flange 3. The pass-through member 9 is arranged at the edge of the opening 8 and encloses the region through which the tightening screw is guided during the final assembly. The pass-through member 9 is constructed so that it is relatively easily plastically deformable for the preassembly to make a riveted joint between the flanges 3 and 4.

For simple assembly it can also be provided that the pass-through member is constructed as conically tapering upwards. A different measure for easier assembly can involve applying a chamfer to the free outer edge of the pass-through member.

The opening 7 in the flange 3 shown above is surrounded by an annular stiffening corrugation 10 to give the flange 3 additional stiffness and prevent any deformation of the flange 3, especially when tightening the tightening screw during final assembly. Similarly, a stiffening corrugation (not shown) can be incorporated in the flange 4 shown below, in addition to the pass-through member 9.

Figure 2:
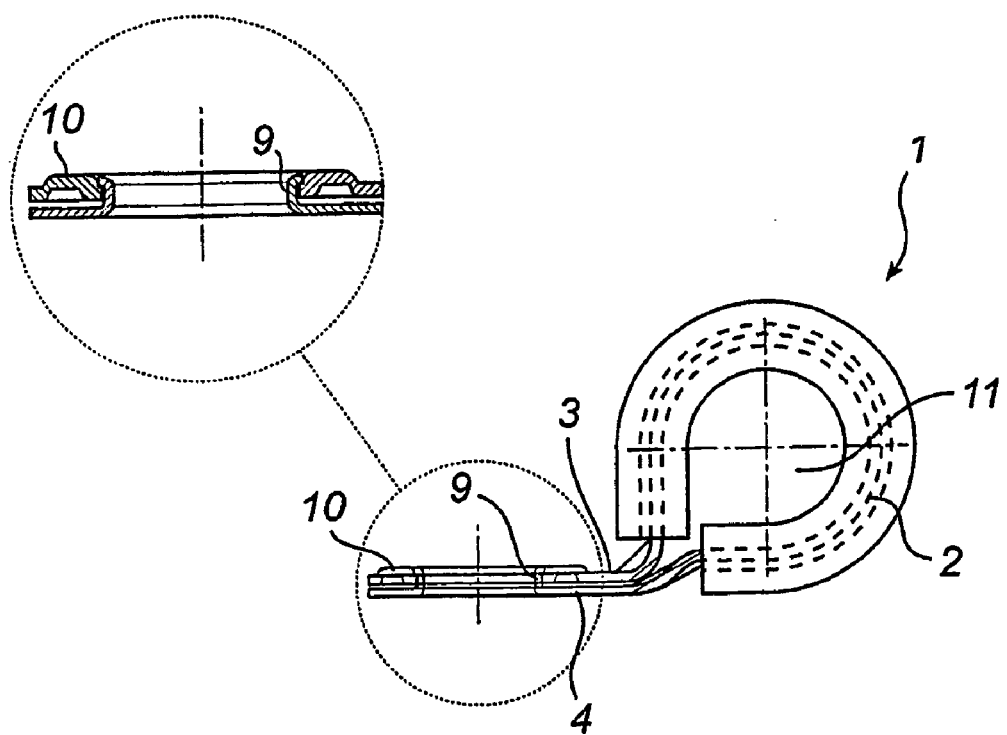
FIG. 2 is a side view of a preassembled clamp.

FIG. 2 shows the clamp 1 in the preassembled state. The fixing strip 2 comprises a tightening cross-section 11 through which a hose to be fixed (not shown) is guided for example. The flanges 3 and 4 lie parallel on one another. The pass-through member 9 is guided through the opening 7 of the upper flange 3 during preassembly and is then outwardly plastically deformed.

As can be seen particularly clearly from FIG. 3a, the outwardly deformed end of the pass-through member 9 lies on the upper flange 3 in the edge region of the opening 7. In this way, a secure connection is obtained between the two flanges 3 and 4. In addition, the openings 7 and 8 are optimally aligned with respect to one another by guiding the annular pass-through member through the opening 7. The annular pass-through member 9 can optionally be interrupted at one or a plurality of points and/or in the area of its free end. As a result of the secure fixing, clamps can be delivered preassembled on assemblies. Any loosening of the riveted joint and possible loss of the clamps preassembled on an assembly resulting therefrom is virtually eliminated.

The upper flange 3 is profiled in the area on which the deformed end of the pass-through member 9 lies, such that a recess 12 is formed between the edge region of the opening 7 and the stiffening corrugation 10, which receives the deformed end of the pass-through member 9.

In FIG. 3b the flange 4 of the clamp shown in FIG. 3a is shown with a screw guided through the opening 8. The screw head lies on the corrugation 10 and on the riveted edge of the pass-through member 9.

Figure 4:
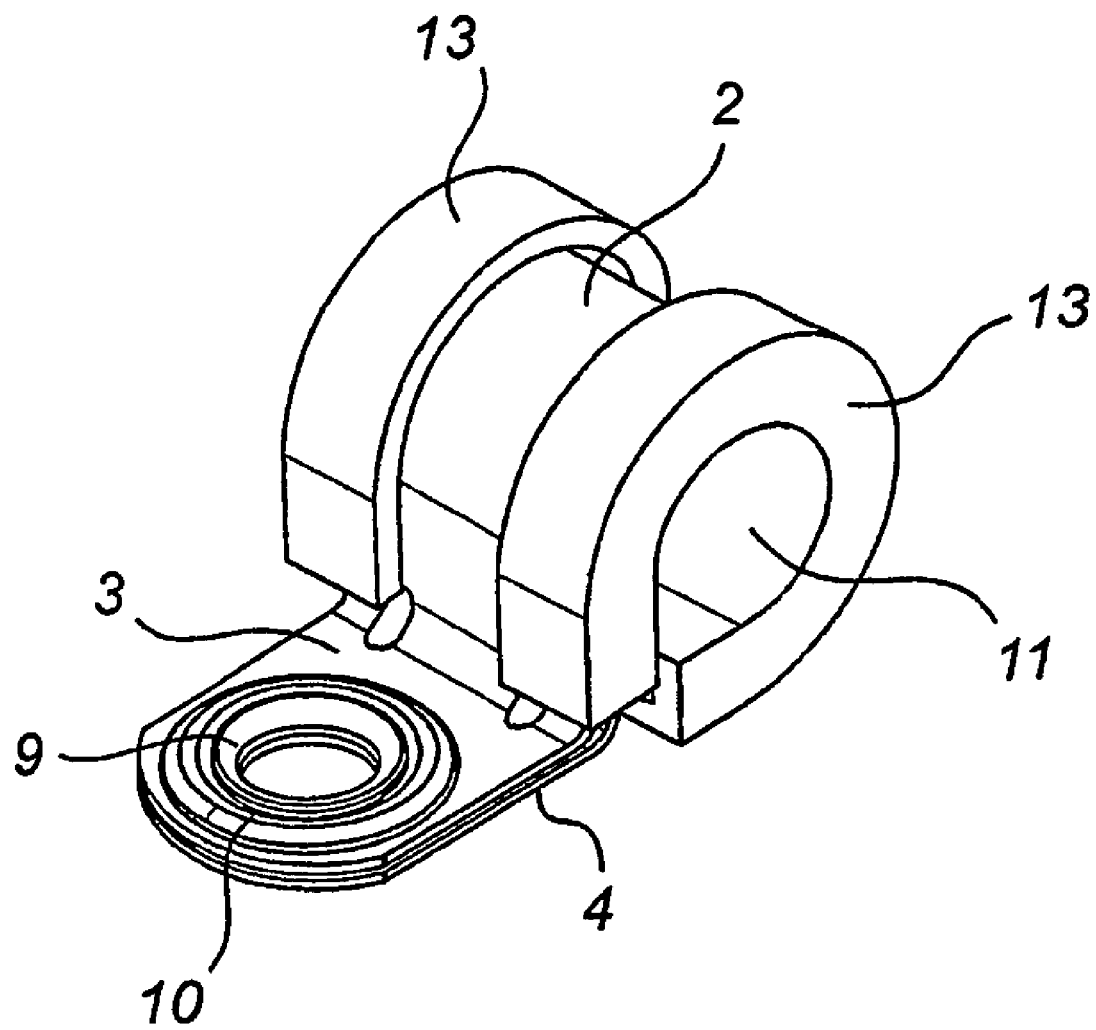
FIG. 4 is a perspective view of the preassembled clamp.

FIG. 4 shows the preassembled clamp 1 in a perspective view. The flanges 3 and 4 are securely joined together by a riveted joint formed by the plastically outwardly deformed ends of the pass-through member 9.

In the exemplary embodiment shown the fixing strip 2 which encloses the tightening cross-section 11 is provided with an elastomer sheath 13 to prevent the holder causing any damage to the hose to be fixed. A central slit on the outside makes it easy to pull the sheath 13 onto the fixing strip 2. Such a sheath can optionally be dispensed with for use on pipes. Especially in the case of pipes for high-temperature media, adaptation is required—either the sheath is made of a temperature-resistant material in this case or the sheath is not used.

During the final assembly a tightening screw is guided through the opening defined by the pass-through member 9 and tightened to fix the hose running through the tightening cross-section 11. The head of the tightening screw can rest on the flange 3.

FIGS. 5 to 7 show another exemplary embodiment of the invention. In this exemplary embodiment the pass-through member 9 is only slightly higher than the material thickness of the flange 3. In this case, the height of the pass-through member can be selected before the riveting process so that this is between 0.3 and 0.8 mm depending on the material thickness and/or the type of material. In any case it is important that the preassembly riveting is sufficiently stable and secure so that it does not loosen prematurely, i.e., sufficient material must be provided so that during riveting at least a force-locking connection can be formed between the pass-through member and the wall of the opening 7. If necessary, sufficient material can be provided so that a deformation of the wall of the opening 7 in the fashion of an undercut 14 is obtained into which the material of the pass-through member enters.

In a further embodiment it can be provided that the free end of the pass-through member 9 is made to project upwards above the flange 3 with a slight projection 15 after riveting.

During the final assembly of the clamp the head of a fixing screw comes to rest on the projection and can release the pass-through member from the riveting. This makes it possible to simply release and remove the clamp for later dismantling, e.g. for repair.

In this embodiment the force for riveting the pass-through member can generally be substantially reduced.

REFERENCE LIST

1 Clamp
2 Fixing strip
3 Fixing flange
4 Fixing flange
5 Stiffening corrugation
6 Stiffening corrugation
7 Opening
8 Opening
9 Pass-through member
10 Annular stiffening corrugation
12 Recess
13 Sheath
14 Oblique undercut
15 Projection

The invention claimed is:

1. A clamp, comprising:
an annular curved fixing strip having a first end and a second end;
two flanges, each connected to a respective end of the fixing strip; and
openings in the respective flanges to guide a tensioning device therethrough, wherein:
at least one of the flanges constitutes portions for producing a riveted joint between the flanges,
the portions includes at least one deformable pass-through member arranged on one of the flanges, and
the pass-through member is plastically deformable to form the riveted joint between the flanges.

2. The clamp according to claim 1, wherein the pass-through member is arranged in a ring shape on one of the flanges so that the pass-through member is guideable through the opening in the other flange during preassembly.

3. The clamp according to claim 1, wherein the pass-through member is arranged in an area of the opening on one of the flanges.

4. The clamp according to claim 1, wherein the pass-through member extends from one of the flanges through the opening of the other flange.

5. The clamp according to claim 1, wherein the pass-through member extends substantially perpendicularly from one of the flanges.

6. The clamp according to claim 1, wherein a free end of the pass-through member is deformed to produce the riveted joint between the flanges.

7. The clamp according to claim 1, wherein a free end of the pass-through member is provided with a chamfer.

8. The clamp according to claim 1, wherein the pass-through member is constructed as tapering towards its free end.

9. The clamp according to claim 1, wherein a free end of the pass-through member is deformed towards outside and lies on the other flange.

10. The clamp according to claim 1, wherein the clamp further includes a profiling for stiffening the flange in an area of the opening of at least one of the flanges.

11. The clamp according to claim 10, wherein the profiling comprises a stiffening corrugation which surrounds the opening in a ring shape.

12. The clamp according to claim 1, wherein the pass-through member is only slightly higher than a material thickness of the flange.

13. The clamp according to claim 12, wherein after riveting, a free end of the pass-through member projects upwards over the flange with a slight projection.

14. The clamp according to claim 12, wherein a free end of the pass-through member rests in an opening of the flanges in a force-locking fashion.

15. The clamp according to claim 12, wherein the flange on a side of a screw head has an undercut at its opening at least after a riveting process, into which a free end of the pass-through member is outwardly deformed.

16. The clamp according to claim 12, wherein the pass-through member rests on a head of a fixing screw with a slight projection and is detachable thereby from riveting.

17. The clamp according to claim 13, wherein the free end of the pass-through member rests in an opening of the flanges in a force-locking fashion.

18. The clamp according to claim 13, wherein the flange on a side of a screw head has an undercut at its opening at least after a riveting process, into which a free end of the pass-through member is outwardly deformed.

19. The clamp according to claim 13, wherein the pass-through member rests on a head of a fixing screw with a slight projection and is detachable thereby from riveting.

* * * * *